Nov. 10, 1942.   E. OVALLE   2,301,809
TIRE FOR CAR WHEELS
Filed April 30, 1941
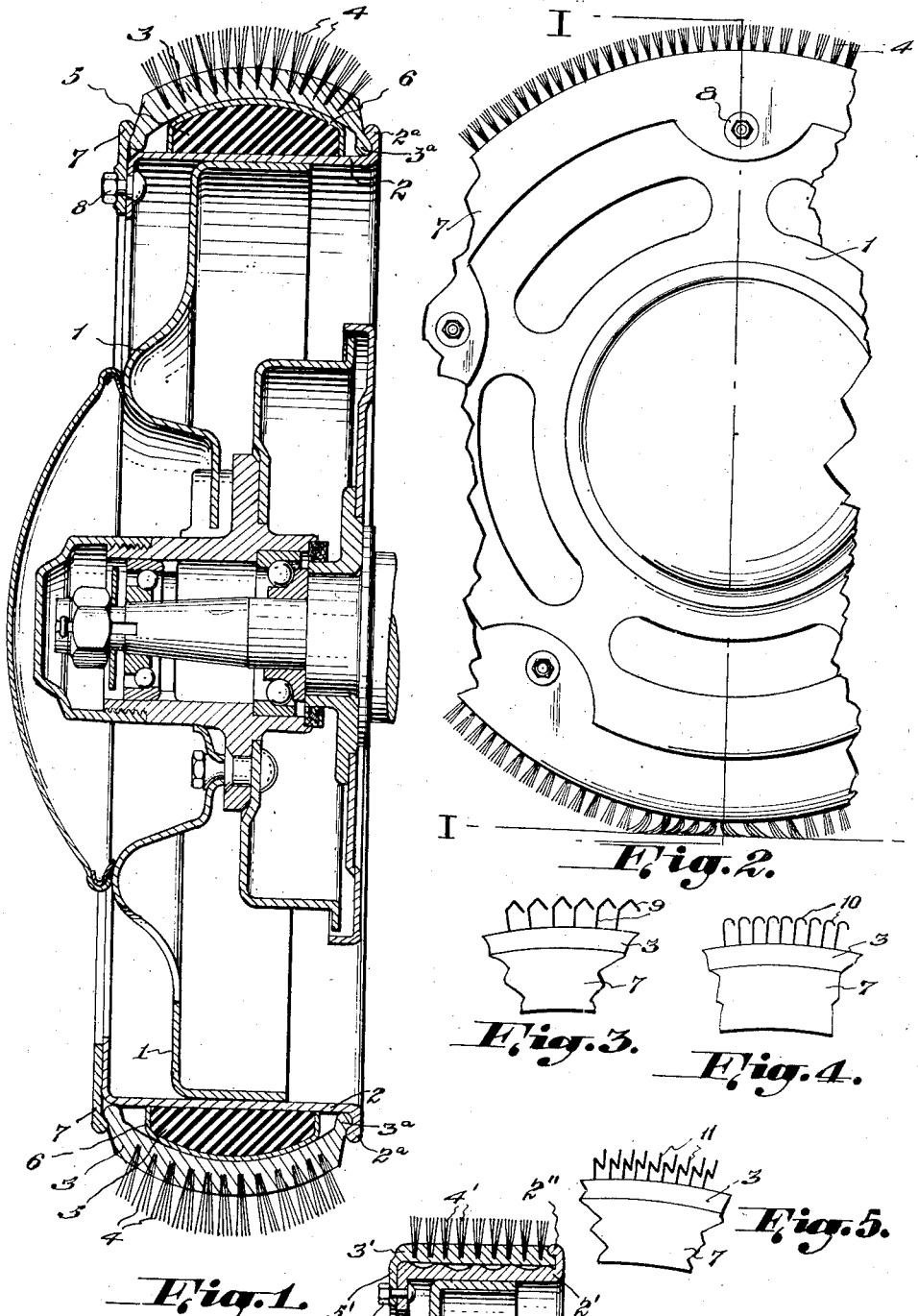

Patented Nov. 10, 1942

2,301,809

UNITED STATES PATENT OFFICE 2,301,809

TIRE FOR CAR WHEELS

Eduardo Ovalle, Santiago, Chile

Application April 30, 1941, Serial No. 391,196

1 Claim. (Cl. 152—274)

This invention refers to improvements in a tire which is adapted for use on various known kinds of wheels. The elastic periphery of this tire acts to dampen every vibration and shock, although the tire is not provided with springs nor an inflated tube.

To obtain the damping action, a plurality of flexible members in the form of prongs are fixed around the outer surface of an annular band. These deformable members possess elasticity and return to their original shape as soon as they move to a non-supporting position.

The elastic or deformable members are placed in such a way that the car weight they temporarily support and the roughnesses of the road, transmit to them several stresses for instance: flexure, compression and shearing stress, and these are efficiently absorbed by this improved structure.

This elastic band may also be applied to rotating disks for power transmission between parallel or inclined shafts, in such a way as to take the place of the gears commonly used for said purposes. For instance, to obtain a power transmission between two parallel shafts, it will be enough to contact properly the deformable members of both elastic bands around each wheel.

Material and shape of the deformable members may be varied according to their application and work to be done. Pointlike shapes of rubber, fibre, synthetic rubber, hardwood, steel, bronze, and also other materials may be used. A variation in shape, dimensions, quantity per square inch of the tire and relating to their position on it, is also possible.

The invention is clearly illustrated in the accompanying drawing, in which:

Figure 1 is a vertical section showing the invention applied to a wheel. Figure 2 is a fragmentary side view of the same. Figures 3, 4 and 5 are elevational details of modified forms of elastic members, and Figure 6 is a fragmentary sectional view of a modified form of the invention.

Referring now, more particularly, to the drawing, there is provided a wheel 1 on which is mounted a rim 2, the rim being provided on its inner edge with a flange 2a. Around this rim is fitted a band 3 which is arcuate in cross section, and carries deformable or elastic members 4 in the form of prongs. The edge 3a of the band 3 fits under the flange 2a of the rim 2. In order to obtain the necessary tire convexity, an auxiliary band 5 may be placed between the rim 2 and band 3. When this auxiliary band 5 is made of any elastic material, it is covered with a metallic plate 6 to prevent a penetration of the metallic prongs through the band 3 and into auxiliary band 5. The mounting of the tire components is easily obtained by suitable means, for instance, by clamping rim 7, which is kept in place by nuts 8. Owing to the longevity of this improved type of tire, it is not necessary to remove it frequently and therefore other attaching methods may be used, according to the work and weight of the cars on which the wheels are mounted.

In mounting the tire, the band 3 must be placed at the same time as the auxiliary band 5, as its inside diameter fits exactly around outside diameter of the rim 2.

The tire convexity has been found necessary in high speed cars, where the friction surface between road and tire has to be kept small. Individual suspension of each car wheel, touching the ground at different angles, makes also a nearly round shape of tire most advisable.

For other applications, for instance on slow tractors or special cars with larger wheels, it is unnecessary to add the auxiliary band mentioned and the band with prongs $4^1$ can be placed directly over the rim. This is shown in Figure 6, where the band $3^1$ is placed directly upon the rim $2^1$, having also a supporting flange $2''$ on its inner edge. In Figure 6 the pressure rim 7 has been omitted because it will be enough to dispose suitable ears $5'$ around the outer edge of band $3^1$ to fix it to the wheel rim $2^1$ by means of the nuts $8^1$.

In Figures 3, 4 and 5 there are shown some different shapes of the deformable members. They may be straight, in radial or perpendicular direction to the wheel axis and arranged in parallel rows as shown at 4 in Figure 2. These prongs may have a radial straight part and other straight inclined parts, arranged in parallel or dispersed rows, as shown at 9 in Figure 3. The deformable members 10 have a radial straight base and a curved end as shown in Figure 4. In Figure 5 each prong has two straight portions arranged in offset relation and connected by an inclined portion as shown at 11.

The new type of elastic tire has perfect smoothness and this is due to the action of the several deformable members over its surface contacting the road. The car's own weight and at the same time, the roughness on the road, will produce a flexure of the deformable elements. This flexure, combined with the compression of each one and all of the acting prongs, will be different according to the pressure direction upon the wheel. In Figure 2 an ideal case has been illustrated, taking a vertical pressure, an even road and the fact that only one line of radial prongs act to support the car's weight.

I claim:

A tire for a wheel comprising, an annular band, elongated flexible prongs carried by said band and projecting radially outward therefrom, an auxiliary band of elastic material arranged within said annular band, and an annular metal plate interposed between the auxiliary band and the annular band for preventing radial inward movement of said prongs.

EDUARDO OVALLE.